INVENTOR.
ALWIN HAHNEL
BY George J. Seligsohn
ATTORNEY

Aug. 9, 1966

A. HAHNEL 3,265,987

PARALLEL-CONNECTED CRYSTAL OSCILLATORS WITH CONTROLLABLE Q CIRCUITS

Filed Feb. 15, 1965

2 Sheets-Sheet 2

3,265,987

PARALLEL-CONNECTED CRYSTAL OSCILLATORS WITH CONTROLLABLE Q CIRCUITS

Alwin Hahnel, Rochester, N.Y., assignor to Stromberg-Carlson Corporation, Rochester, N.Y., a corporation of Delaware Filed Feb. 15, 1965, Ser. No. 432,470
8 Claims. (Cl. 331—49)

This invention relates to frequency generating apparatus and, more particularly, to such apparatus comprising parallel-connected crystal oscillators including entrainment means therefor.

Many systems, such as time division multiplex communication systems, for instance, require a continuous and uninterrupted series of accurately timed periodic clock pulses for synchronization purposes. In fact, often the loss of a single clock pulse may be fatal to the operation of the whole system. Such systems incorporate a master oscillator from which the needed clock pulses are normally derived. Since this master oscillator, like all apparatus, is subject to possible failure, it is the practice, in the prior art, to provide a standby oscillator which is substituted automatically for the master oscillator in response to failure of the master oscillator. Since the respective frequencies of the oscillations produced by two independent oscillators, even if they have the same nominal frequencies, will never in fact be identical to each other, a sharp frequency transient is produced when the system switches to the standby oscillator in response to the failure of the master oscillator. This frequency transient can easily result in the loss or improper timing of a clock pulse derived therefrom, with disastrous consequences to the system as a whole.

Therefore, in the prior art, in order to somewhat minimize the effect of such a frequency transient, the frequency of the oscillations of the standby oscillator may be normally synchronized or entrained by the oscillations of the master oscillator, such synchronization being removed in response to the substitution of the standby oscillator for the master oscillator in the system. In addition, when the master oscillator is repaired or replaced, it is necessary to synchronize or entrain the frequency of the oscillations thereof with those of the standby oscillator prior to switching the repaired or replaced master oscillator back into the system.

It will be seen that, in the prior art, equipment is needed to sense the failure of the master oscillator, to automatically switch the system from the master oscillator to the standby oscillator in response to the failure of the master oscillator being sensed, and to synchronize the standby oscillator with the master oscillator prior to the standby oscillator being switched into the system and then to synchronize the master oscillator with the standby oscillator prior to the switching back of the master oscillator into the system. All this needed equipment, of course, increases to a large extent the complexity of the pulse generating means of the system. Furthermore, even if all the above set forth precautions for avoiding a frequency transient are taken, the mere act of switching the system from one oscillator to another has the tendency to produce at least some unwanted transients which may disrupt the operation of the system.

The present invention does away with the need for automatically switching the system from a master oscillator to a standby oscillator in response to a failure of the master oscillator being sensed. More particularly, in the present invention, two oscillators, either one of which provides sufficient power to generate the needed clock pulses, are connected in parallel to a common output terminal, so that oscillations from both oscillators are simultaneously applied to the system. Therefore, no switching of the system from a first, or master, oscillator to a second, or standby, oscillator ever takes place. Thus, in the present invention, no unwanted switching transients can be produced.

A problem which is normally encountered when two oscillators are connected in parallel to a common output is that unwanted beat frequencies are generated, since, as stated above, the respective frequencies of the oscillations of two independent oscillators will never be identical to each other. This problem is overcome in the present invention by providing means for selectively synchronizing the frequency of the oscillations of either oscillator with the oscillations of the other oscillator, so that the respective frequencies of the oscillations of both oscillators become identical to each other. This is accomplished by providing simple switches, which may be manual, in each oscillator for selectively switching the Q of the frequency-determining means thereof between a first relatively high value thereof and a second relatively low value thereof; and further by providing injection means, which also employ simple switches which may be manual, for selectively injecting oscillations from either one of the oscillators into the frequency-determining means of the other oscillator. In practice, the Q of the frequency-determining means of the synchronizing oscillator is selectively set to its relatively high value, while the Q of the frequency-determining means of the synchronized oscillator is selectively set to its relatively low value, and oscillations from only the synchronizing oscillator are injected into the frequency-determining means of the synchronized oscillator. Obviously, either one of the two oscillators may be made the synchronizing oscillator, while the other is made the synchronized oscillator, simply by properly operating the Q-changing switches and by properly operating the injection means switches.

If a fault occurs in the synchronizing oscillator, the synchronized oscillator will lose its synchronization. However, the formerly synchronized oscillator will continue to provide oscillations at its own natural frequency to the common output terminal. More particularly, if the synchronized oscillator should lose its synchronization, the frequency of the oscillations produced thereby will slowly drift to its own natural frequency without producing any unwanted transients. Then, the switch of the injection means which permitted the now faulty synchronizing oscillator to inject oscillations into the frequency-determining means of the synchronized oscillator may be opened, the faulty oscillator may be replaced, the Q-changing switch of the formerly synchronized oscillator may be set to provide a relatively high Q while the Q-changing switch of the replaced oscillator may be set to provide a relatively low Q, and the switches of the injection means may be set to permit only the formerly synchronized oscillator to inject oscillations into the frequency-determining means of the replaced oscillator. When this is done, the formerly synchronized oscillator will become the current synchronizing oscillator and the oscillator which replaced the faulty formerly synchronizing oscillator will become the current synchronized oscillator. However, it will be seen, oscillations having a frequency within the required tolerance will be continuously applied to the common output terminal without interruption, despite the fault in the formerly synchronizing oscillator, the replacement of the formerly synchronizing oscillator and the reversal in the synchronizing and synchronized roles of the two oscillators. Thus, the series of clock pulses derived from these oscillations will continue to be supplied to the system without any possibility of the loss or improper timing of even a single pulse.

It is, therefore, an object of the present invention to provide an improved frequency source wherein the output of said source is not significantly distrubed by faults occurring within the source.

It is a more particular object of the present invention to provide such a frequency source which employs two parallel-connected synchronized crystal oscillators.

These and other objects, features and advantages of the present invention will become more apparent from the following detailed description, taken together with the accompanying drawings, in which.

Figure 1:
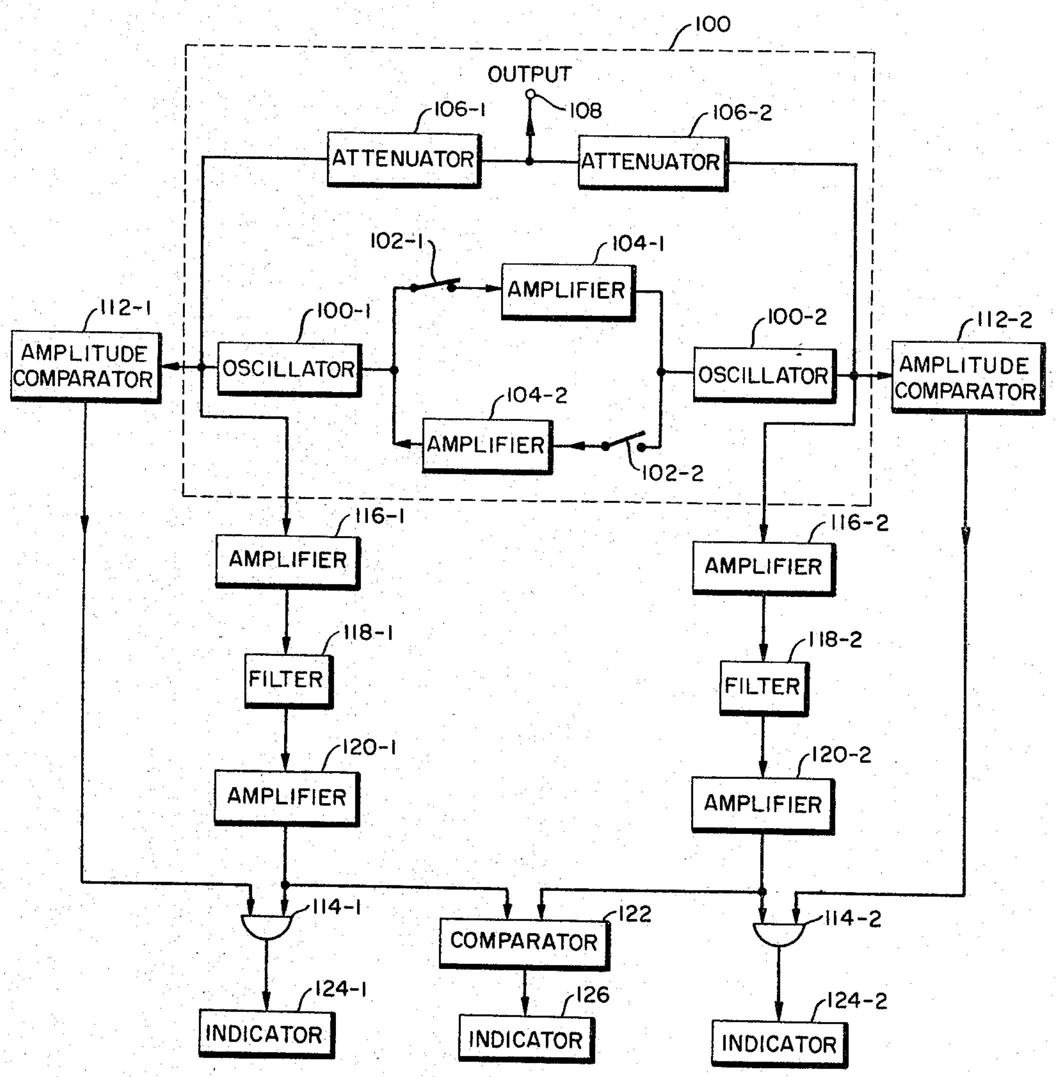
FIG. 1 is a block diagram of a preferred embodiment of the invention.

Referring now to FIG. 1, there is shown two oscillators 100–1 and 100–2, respectively. Injection means, comprising switches 102–1 and 102–2, and amplifiers 104–1 and 104–2, is inserted between oscillators 100–1 and 100–2. More particularly, when switch 102–1 is closed and switch 102–2 is open, as shown, oscillations from oscillator 100–1 will be applied through amplifier 104–1 to the frequency-determining means of oscillator 100–2, whereby the frequency of the oscillations of oscillator 100–2 will be synchronized with the frequency of the oscillations from oscillator 100–1. When, not shown, switch 102–1 is open and switch 102–2 is closed, oscillations from oscillator 100–2 will be applied through amplifier 104–2 to the frequency-determining means of oscillator 100–1, whereby the frequency of the oscillations of oscillator 100–1 will be synchronized with the frequency of the oscillations from oscillator 100–2. Oscillations from oscillator 100–1 are applied through attenuator 106–1 to common output terminal 108 and oscillations from oscillator 100–2 are applied through attenuator 106–2 to common output terminal 108, as shown.

Oscillators 100–1 and 100–2, switches 102–1 and 102–2, amplifiers 104–1 and 104–2, attenuators 106–1 and 106–2, and common output terminal 108, which make up the heart of the present invention, are shown included within the broken outline 110.

Figure 2:
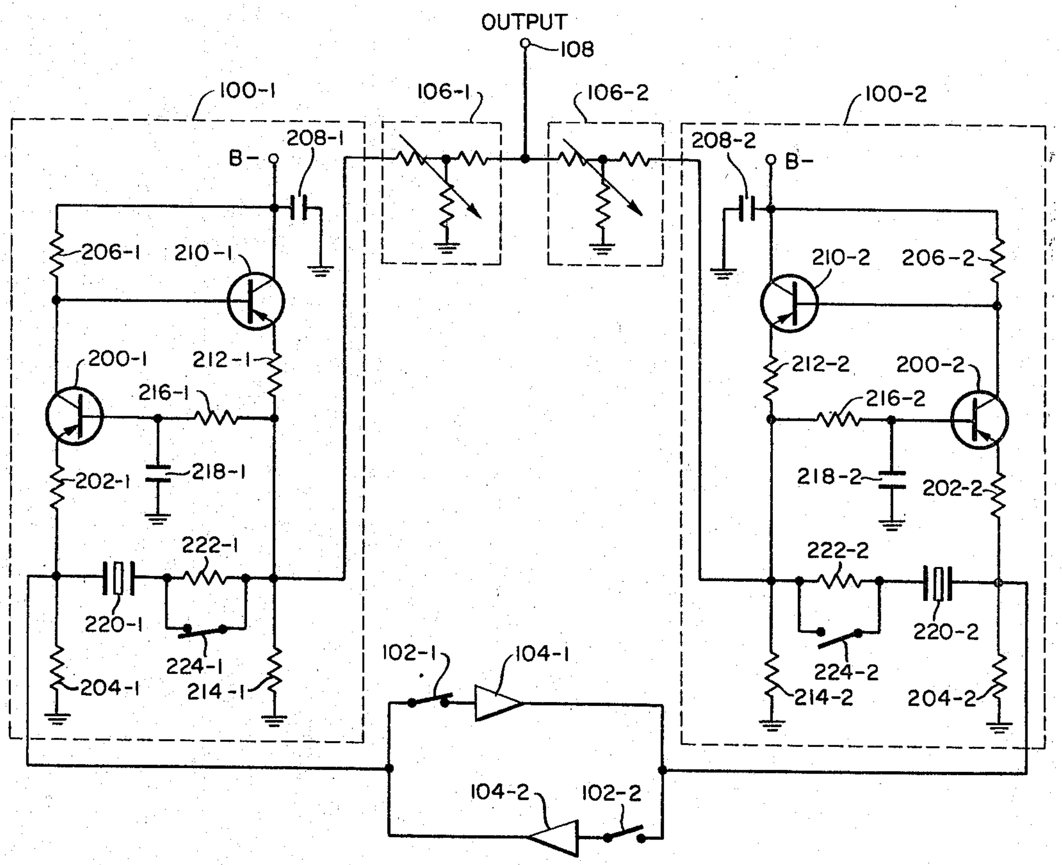
FIG. 2 is a detailed schematic circuit diagram of a preferred embodiment of those components of FIG. 1 included within the broken outline of FIG. 1.

Referring now to FIG. 2, which shows in detail the preferred embodiments of those components included within broken outline 100 of FIG. 1, it will be seen that each of oscillators 100–1 and 100–2 is composed of identical structure. More particularly, oscillator 100–1 comprises a voltage amplifier consisting of transistor 200–1 having its emitter connected to a point of reference potential through a voltage divider including serially-connected resistances 202–1 and 204–1, and having its collector connected to a point of fixed potential, designated B–, with respect to the point of reference potential through load resistance 206–1. This point of fixed potential is maintained at effective reference potential for alternating current signals by bypass capacitance 208–1.

Oscillator 100–1 further includes an emitter follower consisting of transistor 210–1 having its emitter connected to the point of reference potential through a voltage divider including serially-connected resistances 212–1 and 214–1, and its collector connected directly to the aforesaid point of fixed potential. The output of the voltage amplifier at the collector of transistor 200–1 is applied directly as an input to the emitter follower at the base of transistor 210–1. The junction of resistances 212–1 and 214–1 is connected to the base of transistor 200–1 through grid leak resistance 216–1. The base of transistor 200–1 is maintained at effective reference potential at the frequency of oscillations by bypass capacitance 218–1. Frequency-determining means, consisting of crystal 220–1 and serially-connected Q-reducing resistance 222–1, which may be shunted by switch 224–1, is connected, as shown, between the junction of resistances 212–1 and 214–1 and the junction of resistances 202–1 and 204–1.

Considering now the inherent operation of oscillator 100–1, the output of the voltage amplifier consisting of transistor 200–1 is power amplified, but not voltage amplified, by the emitter follower comprising transistor 210–1. A portion of the output of this emitter follower, which has a relatively low output impedance, is positively fed back to the emitter circuit of the voltage amplifier by the frequency-determining means. Since the frequency-determining means has a low impedance only at its resonant frequency, the only frequency component at the output of the emitter follower which is effectively fed back through the frequency-determining means is that which is at the natural frequency of crystal 220–1. Therefore, oscillator 100–1 will oscillate at a frequency substantially equal to the resonant frequency of crystal 220–1. Furthermore, the time constant formed by the grid leak 216–1 and bypass capacitance 218–1 is long with respect to the period of an oscillation. Therefore, the base of transistor 200–1 of the voltage amplifier will have a bias supplied thereto which is proportional to the amplitude of the oscillations produced by oscillator 100–1.

The inherent operation of oscillator 100–2, the elements of which correspond both in structure and function with those of oscillator 100–1, is identical to that of oscillator 100–1.

Further, as shown, oscillations of oscillator 100–1 present at the junction of resistances 202–1 and 204–1 may be injected into oscillator 100–2 at the junction of resistances 202–2 and 204–2 by means of switch 102–1, when closed, and amplifier 104–1, or, in the alternative, oscillations of oscillator 100–2 at the junction of resistances 202–2 and 204–2 may be injected into oscillator 100–1 at the junction of resistances 202–1 and 204–1 by means of switch 102–2, when closed, and amplifier 104–2.

When oscillator 100–1 is utilized to entrain the oscillations of oscillator 100–2, switch 224–1 of oscillator 100–1 and switch 102–1 are closed, as shown, while switch 224–2 of oscillator 100–2 and switch 102–2 are open, as shown. On the other hand, when oscillator 100–2 is utilized to entrain the oscillations of oscillator 100–1, switch 224–2 of oscillator 100–2 and switch 102–2 are closed, while switch 224–1 of oscillator 100–1 and switch 102–1 are open.

It will be seen that the closed condition of the switch 224 of the synchronizing oscillator, whichever it may be in any given case, and the open condition of the switch 224 of the synchronized oscillator results in the Q of the frequency-determining means of the synchronizing oscillator being higher than that of the synchronized oscillator. Further, it will be seen that the oscillations passed by the crystal of the synchronizing oscillator are applied through the selected one of amplifiers 104 to the emitter circuit of the voltage amplifier of the synchronized oscillator. These oscillations from the synchronizing oscillator are applied to the voltage amplifier of the synchronized oscillator in parallel with the oscillations from the frequency-determining means of the synchronized oscillator. Since the Q of the frequency-determining means of the synchronizing oscillator is higher than that of the synchronized oscillator, and the oscillations from the synchronizing oscillator applied to the synchronized oscillator have been amplified by the selected one of amplifiers 104–1 and 104–2, the injected oscillations from the synchronizing oscillator, rather than the frequency-determining means of the synchronized oscillator, will be effective in determining the frequency of the oscillations of the synchronized oscillator.

As shown, the output from oscillator 100–1 is taken at the junction of resistance 212–1 and 214–1 and applied through attenuator 106–1, which may be an adjustable T-pad, to common output terminal 108, while the output from oscillator 100–2 is taken at the junction of resistances 212–2 and 214–2 and applied through attenuator 106–2, which also may be an adjustable T-pad, to common output terminal 108.

One of the advantages of the particular circuitry utilized for each of oscillators 100–1 and 100–2 is that the failure of the emitter follower transistor 210–1 or 210–2, as the case may be, of the synchronized oscillator caused by a short circuit in that transistor will not result in a complete breakdown of the injected output voltage of the selected one of amplifiers 104 coupled to the synchronized oscillator. The presence of resistance 212–1 or 212–2 permits a useful, although smaller than normal, signal from the output of the selected one of amplifiers 104–1 and 104–2 coupled to the synchronized oscillator to be applied through the frequency-determining means of the synchronized oscillator to the output from that oscillator taken at the junction of the resistances 212–1 or 212–2 and 214–1 or 214–2 of that oscillator. The output impedance of each of the amplifiers 104–1 and 104–2 is chosen small enough to provide this useful signal without the requirement of a large value for the resistances 212–1 and 212–2.

Referring back to FIG. 1, there is shown outside of broken outline 110 means for monitoring the proper operation of each of oscillators 100–1 and 100–2. More particularly, coupled to the output of oscillator 100–1 is an amplitude comparator 112–1 and coupled to the output of oscillator 100–2 is an amplitude comparator 112–2. Each of amplitude comparators 112–1 and 112–2 produces an output signal so long as the amplitude of the oscillations produced by the oscillator to which it is coupled exceeds a predetermined value. The output from amplitude comparators 112–1 is applied as a first input to AND gate 114–1, while the output from amplitude comparator 112–2 is applied as a first input to AND gate 114–2.

In addition, the output from oscillator 100–1, after passing through input amplifier 116–1, band-pass filter 118–1, centered about the nominal frequency of oscillations, and output amplifier 120–1 is applied as a second input to AND gate 114–1, and as a first input to comparator 122. In a similar manner, the output from oscillator 100–2, after passing through input amplifier 116–2, band-pass filter 118–2, centered about the nominal frequency of oscillations, and output amplifier 120–2 is applied as a second input to AND gate 114–2, and as a second input to comparator 122.

AND gate 114–1 will produce an output only when the amplitude of the oscillations from oscillator 100–1 exceeds the aforesaid predetermined value and when the frequency of the oscillations from oscillator 100–1 is within a predetermined frequency tolerance with respect to the nominal frequency of oscillations. The output from AND gate 114–1 is applied as an input to indicator 124–1, which operates a light and/or a buzzer in response to the failure of AND gate 114–1 to produce an output, which indicates the failure of oscillator 100–1. In a similar manner, indicator 124–2 indicates the failure of oscillator 100–2.

Comparator 122 compares the relative amplitudes of the outputs from amplifiers 120–1 and 120–2, respectively, which is a measure of the frequency deviation between the frequency of oscillations of oscillator 100–1 and oscillator 100–2. Since, if all is going well, the frequency of oscillations of each of the two oscillators is identical, any significant frequency deviation between them, as measured by comparator 122, indicates a fault in synchronization. Indicator 126, which is coupled to the output of comparator 122, produces a visible and/or audible indication in response to the occurrence of such a fault in synchronization.

In response to any of indicators 124–1, 126, or 124–2 indicating a fault, steps may be taken to replace the faulty oscillator or other component. Since the two oscillators normally operate in parallel, and a single one of the oscillators is capable of supplying sufficient power to a system wherein the invention may be used, the faulty oscillator may be replaced while the other oscillator continues to supply oscillations to common output terminal 108. Therefore, there is no interruption in the presence of oscillations at common output terminal 108 due to a fault occurring in any component.

Although only a preferred embodiment of this invention has been described herein, it is not intended that the invention be restricted thereto, but that it be limited only by the true spirit and scope of the appended claims.

What is claimed is:

1. In combination, a first oscillator including frequency-determining means for normally producing oscillations therefrom having a frequency within a predetermined frequency band, a second oscillator including frequency-determining means for normally producing oscillations therefrom having a frequency within said predetermined frequency band, the frequency-determining means of each of said respective first and second oscillators including switching means for selectively switching the Q of that frequency-determining means between a first given relatively high value thereof and a second given relatively low value thereof, the switching means of either one of said first and second oscillators being selectively set to provide said first given value of Q for the frequency-determining means thereof while the switching means of the other of said first and second oscillators is selectively set to provide said second given value of Q for the frequency-determining means thereof, injection means for selectively injecting oscillations from said one oscillator into the frequency-determining means of said other oscillator to synchronize the frequency of the oscillations of said other oscillator with the frequency of the oscillations of said one oscillator, a common output terminal, and coupling means for simultaneously applying the oscillations from each of said first and second oscillations to said common output terminal.

2. The combination defined in claim 1, wherein said frequency-determining means of each respective first and second oscillator further includes a crystal and a resistance in series with said crystal, and said switching means thereof includes a switch for selectively shunting said resistance.

3. The combination defined in claim 1, wherein said injection means includes first means comprising an amplifier and a switch effective only when set for injecting oscillations of said first oscillator through said amplifier thereof into the frequency-determining means of said second oscillator, and second means comprising an amplifier and a switch effective only when set forth injecting oscillations of said second oscillator through said amplifier thereof into the frequency-determining means of said first oscillator, only one of the respective switches of said first and second means being set at any one time.

4. The combination defined in claim 1, wherein said coupling means includes a first attenuator for applying oscillations from said first oscillator to said common output terminal and a second attenuator for applying oscillations from said second oscillator to said common output terminal.

5. The combination defined in claim 4, wherein at least one of said first and second attenuators is adjustable.

6. The combination defined in claim 1, further including means coupled to at least one of said first and second oscillators for indicating an alarm condition in response to the oscillations of the oscillator to which it is coupled having less than a given amplitude or having a frequency outside of said predetermined band.

7. The combination defined in claim 1, further including means coupled to said first and second oscillators for indicating an alarm condition in response to the failure of the respective frequencies of the respective oscillations of said first and second oscillators being substantially identical to each other.

8. The combination defined in claim 1, wherein each of said first and second oscillators further includes first and second transistors each having an emitter, a collector and a base, first and second serially-connected resistances coupling the emitter of said first transistor to a point of reference potential, a third resistance coupling the collector of said first transistor to a point of fixed potential with respect to said point of reference potential, means coupling the collector of said first transistor to the base of said second transistor, fourth and fifth serially-connected resistance coupling the emitter of said second transistor to said point of reference potential, means for coupling the collector of said second transistor to a point of fixed potential with respect to said point of reference potential, a sixth resistance coupling the junction of said fourth and fifth resistances to the base of said first transistor, a capacitance coupling the base of said first transistor to said point of reference potential, and said frequecny-determining means of that oscillator being coupled between the junction of said first and second resistances and the junction of said fourth and fifth resistances.

No references cited.

ROY LAKE, *Primary Examiner*.

J. KOMINSKI, *Assistant Examiner*.